US008791834B2

(12) United States Patent
Brennan et al.

(10) Patent No.: US 8,791,834 B2
(45) Date of Patent: Jul. 29, 2014

(54) FIXED NETWORK FOR AN AUTOMATIC UTILITY METER READING SYSTEM

(71) Applicant: Neptune Technology Group, Inc., Tallassee, AL (US)

(72) Inventors: Jim Brennan, Tallassee, AL (US); David Hamilton, Tallassee, AL (US); Mohammed Ali, Tallassee, AL (US); Joe Cely, Tallassee, AL (US); Quentin Easterling, Tallassee, AL (US); John Bilodeau, Tallassee, AL (US); Ed Poorbaugh, Tallassee, AL (US); Burt Carter, Tallassee, AL (US); Richard Kynard, Tallassee, AL (US); Warren Wynn, Tallassee, AL (US); Dan White, Tallassee, AL (US); David Pettit, Tallassee, AL (US)

(73) Assignee: Neptune Technology Group, Inc., Tallassee, AL (US)

( * ) Notice: Subject to any disclaimer, the term of this patent is extended or adjusted under 35 U.S.C. 154(b) by 0 days.

(21) Appl. No.: 13/691,580

(22) Filed: Nov. 30, 2012

(65) Prior Publication Data

US 2013/0088366 A1    Apr. 11, 2013

Related U.S. Application Data

(60) Division of application No. 12/178,541, filed on Jul. 23, 2008, now Pat. No. 8,350,717, which is a continuation-in-part of application No. 11/964,001, filed on Dec. 24, 2007, now abandoned, which is a continuation of application No. 11/758,661, filed on Jun. 5, 2007, now abandoned.

(60) Provisional application No. 60/803,926, filed on Jun. 5, 2006.

(51) Int. Cl.
    *G08C 19/16*    (2006.01)
(52) U.S. Cl.
    USPC .................................................... 340/870.2
(58) Field of Classification Search
    USPC ..................................................... 340/870.2
    See application file for complete search history.

(56) References Cited

U.S. PATENT DOCUMENTS

| 5,056,107 | A | 10/1991 | Johnson et al. |
| 5,079,508 | A | 1/1992 | Corain et al. |
| 5,087,875 | A | 2/1992 | Balch et al. |
| 5,113,130 | A | 5/1992 | Balch |
| 5,115,190 | A | 5/1992 | Varney, Jr. |
| 5,245,275 | A | 9/1993 | Germer et al. |

(Continued)

FOREIGN PATENT DOCUMENTS

| WO | WO 2005/099093 | 10/2005 |
| WO | WO 2005/106751 | 11/2005 |
| WO | WO 2005/107280 | 11/2005 |

*Primary Examiner* — Scott Bauer
(74) *Attorney, Agent, or Firm* — Paul Sykes; Bradley Arant Boult Cummings LLP

(57) ABSTRACT

A fixed network for automatically reading a utility meter system has been developed. The network includes multiple meter interface units (MIUs) that each collect data from a designated utility meter. The collected data is transmitted to a primary data collector. The network includes multiple data collectors and each MIU identifies its own primary data collector based on signal quality between the collector and the MIU. The network includes a central host computer that is used to receive the collected data from the primary data collectors.

14 Claims, 4 Drawing Sheets

(56) References Cited

U.S. PATENT DOCUMENTS

| | | |
|---|---|---|
| D343,803 S | 2/1994 | Ouellette et al. |
| 5,298,894 A | 3/1994 | Cerny et al. |
| 5,325,051 A | 6/1994 | Germer et al. |
| 5,377,232 A | 12/1994 | Davidov et al. |
| 5,383,134 A | 1/1995 | Wrzesinski |
| 5,448,229 A | 9/1995 | Lee, Jr. |
| 5,461,558 A | 10/1995 | Patsiokas et al. |
| 5,469,153 A | 11/1995 | Atherton et al. |
| 5,477,216 A | 12/1995 | Lee, Jr. et al. |
| 5,481,259 A | 1/1996 | Bane |
| 5,493,287 A | 2/1996 | Bane |
| 5,553,094 A | 9/1996 | Johnson et al. |
| 5,617,084 A | 4/1997 | Sears |
| 5,631,636 A | 5/1997 | Bane |
| 5,661,750 A | 8/1997 | Fulton |
| 5,673,252 A | 9/1997 | Johnson et al. |
| 5,719,564 A | 2/1998 | Sears |
| 5,726,646 A | 3/1998 | Bane et al. |
| 5,877,703 A | 3/1999 | Bloss, Jr. et al. |
| 5,883,886 A | 3/1999 | Eaton et al. |
| 5,909,640 A | 6/1999 | Farrer et al. |
| 5,910,774 A | 6/1999 | Capriotti et al. |
| 5,933,092 A | 8/1999 | Ouellette et al. |
| 5,963,146 A | 10/1999 | Johnson et al. |
| 6,069,571 A | 5/2000 | Tell |
| 6,072,405 A | 6/2000 | Sears |
| 6,100,816 A | 8/2000 | Moore |
| 6,133,850 A | 10/2000 | Moore |
| 6,137,423 A | 10/2000 | Glorioso et al. |
| 6,172,616 B1 | 1/2001 | Johnson et al. |
| 6,195,018 B1 | 2/2001 | Ragle et al. |
| 6,219,655 B1 | 4/2001 | Schleich et al. |
| 6,232,886 B1 | 5/2001 | Morand |
| 6,249,516 B1 | 6/2001 | Brownrigg et al. |
| 6,333,975 B1 | 12/2001 | Brunn et al. |
| 6,373,399 B1 | 4/2002 | Johnson et al. |
| 6,437,692 B1 | 8/2002 | Petite et al. |
| 6,477,386 B1 | 11/2002 | Giles |
| 6,512,463 B1 | 1/2003 | Campbell et al. |
| 6,636,893 B1 | 10/2003 | Fong |
| 6,639,957 B2 | 10/2003 | Cahill-O'Brien et al. |
| 6,653,945 B2 | 11/2003 | Johnson et al. |
| 6,710,721 B1 | 3/2004 | Holowick |
| 6,836,737 B2 | 12/2004 | Petite et al. |
| 6,856,257 B1 | 2/2005 | Van Heteren |
| 6,859,831 B1 | 2/2005 | Gelvin et al. |
| 6,885,309 B1 | 4/2005 | Van Heteren |
| 6,900,737 B1 | 5/2005 | Ardalan et al. |
| 6,931,445 B2 | 8/2005 | Davis |
| 6,946,972 B2 | 9/2005 | Mueller et al. |
| 6,954,144 B1 | 10/2005 | Kiser et al. |
| 6,963,738 B1 | 11/2005 | Fontaine |
| 2001/0038342 A1 | 11/2001 | Foote |
| 2002/0019712 A1 | 2/2002 | Petite et al. |
| 2002/0109608 A1 | 8/2002 | Petite et al. |
| 2002/0169643 A1 | 11/2002 | Petite et al. |
| 2003/0078029 A1 | 4/2003 | Petite |
| 2005/0083235 A1 | 4/2005 | Savage et al. |
| 2005/0086182 A1 | 4/2005 | Nagy et al. |
| 2005/0110656 A1 | 5/2005 | Patterson et al. |
| 2005/0162283 A1 | 7/2005 | Salazar Cardozo |
| 2005/0184881 A1 | 8/2005 | Dusenberry et al. |
| 2005/0184882 A1 | 8/2005 | Angelis et al. |
| 2005/0225455 A1 | 10/2005 | Patterson et al. |
| 2005/0234837 A1 | 10/2005 | Ramachandran et al. |
| 2005/0237959 A1 | 10/2005 | Osterloh et al. |
| 2005/0238044 A1 | 10/2005 | Osterloh et al. |
| 2005/0239414 A1 | 10/2005 | Mason, Jr. et al. |
| 2005/0240315 A1 | 10/2005 | Booth et al. |
| 2005/0240540 A1 | 10/2005 | Borleske et al. |
| 2006/0009927 A1 | 1/2006 | Osterloh et al. |
| 2006/0012491 A1 | 1/2006 | Mahowald |
| 2006/0031180 A1* | 2/2006 | Tamarkin et al. ............. 705/412 |

* cited by examiner

| Preamble | Packet type | Collector address | MIU ID | Data | CRC/ECC |

Figure 4a

| Preamble | Packet type | MIU address | Collector address | Data | CRC/ECC |

Figure 4b

| Preamble | Packet type | MIU ID | Read | Tamper | Sequence | CRC |

Figure 4c

| Preamble | Packet type | MIU | Collector | Time of Day | Sequence | CRC |

Figure 4d

FIXED NETWORK FOR AN AUTOMATIC UTILITY METER READING SYSTEM

CROSS-REFERENCE TO RELATED APPLICATIONS

This application is divisional of, and claims the benefit of and priority to, U.S. patent application Ser. No. 12/178,541 filed on Jul. 23, 2008, which is a continuation-in-part of U.S. patent application Ser. No. 11/964,001 that was filed on Dec. 24, 2007 which is a continuation of U.S. patent application Ser. No. 11/758,661 that was filed on Jun. 5, 2007 entitled "Fixed Network for an Automatic Utility Meter Reading System" which claims priority from U.S. Provisional Patent Application No. 60/803,926 that was filed on Jun. 5, 2006 entitled "Fixed Network for an Automatic Utility Meter Reading System".

FIELD OF THE INVENTION

The invention relates generally to automatic utility meter systems. More specifically, the invention relates to a fixed network for an automatic utility meter reading system.

BACKGROUND ART

Meters that measure utility usage are widely used to keep track of the consumption of an end user. For example, utility companies that supply water to their customers typically charge for their product based on usage. Usage of water is typically measured by a meter that is installed for each individual customer on their respective water supply line. A utility company employee periodically (usually once a month) manually collects the reading from the meter. These readings are usually cumulative, so the amount of usage for the present period is calculated by subtracting the reading from the previous period. Once the usage is calculated, the customer is billed for that amount of water used during that period.

Manually reading usage meters is labor intensive, time consuming expensive, and subject to human error especially for residential customers because each meter monitors relatively little usage as compared with larger, commercial customers. As a result, meters combined with electronics have been used to allow for quicker, more efficient, and more accurate collection of usage data along with other pertinent information such leak information or reverse flow detection. The electronic meters may still measure usage by monitoring flow through a conventional, mechanical meter. The usage readings are stored electronically and then transmitted via radio signals to a local transmitter/receiver operated by the utility.

The transmitter/receiver that receives the data from the meter is typically a mobile receiver that can be handheld or vehicle mounted. A utility employee drives or walks within proximity to the meter and the meter data is received and stored in the transmitter/receiver. While this system is an improvement over a manual meter reading by an employee, it is still labor intensive in that it requires an individual to transport a transmitter/receiver into range of the electronic meter. Consequently, a fixed communications network for automatically reading utility meter data is desirable.

SUMMARY OF THE INVENTION

In some aspects, the invention relates to a fixed network for utility meter reading system, comprising: a plurality of meter interface units (MIU), where each MIU collects data from a designated utility meter; a plurality of data collectors, where each MIU identifies and establishes a communication link with a primary data collector that has been identified as having optimal signal quality with the MIU; and a central host computer that receives the data from the plurality of data collectors.

In other aspects, the invention relates to a fixed network for utility meter reading system, comprising: a plurality of meter interface units where each MIU collects data from a designated utility meter; a plurality of data collectors that receives the data from at least one MIU; means for identifying a primary data collector for each MIU from the plurality of data collectors based on signal quality with the MIU; and a central host computer that receives the data from the plurality of data collectors.

Other aspects and advantages of the invention will be apparent from the following description and the appended claims.

BRIEF DESCRIPTION OF DRAWINGS

It should be noted that identical features in different drawings are shown with the same reference numeral.

FIGS. 4a-4d show detailed sequence diagrams of various examples of transmission packets in accordance with the present invention.

DETAILED DESCRIPTION

Figure 1:
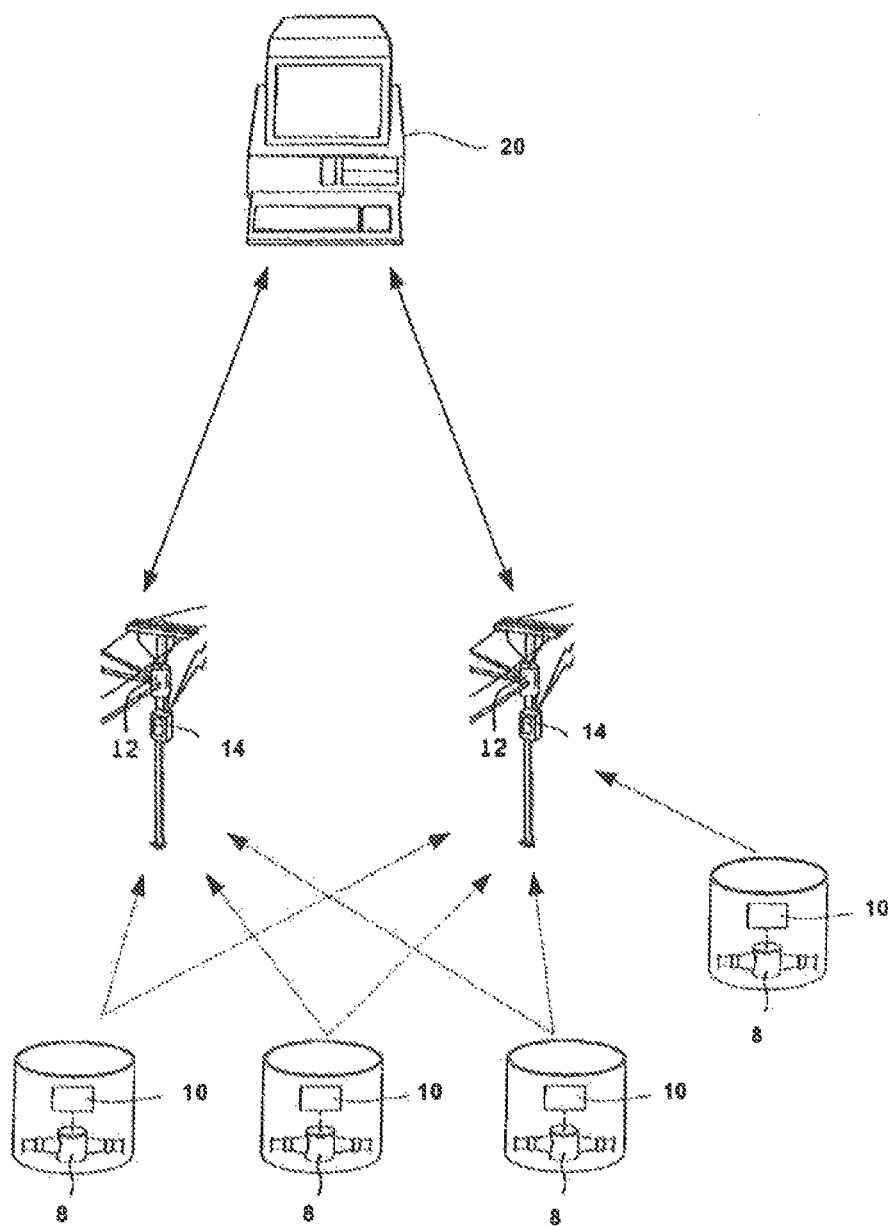
FIG. 1 shows a schematic of a fixed network automatic utility meter reading system in accordance with one example of the present invention.

A fixed communications network for automatic reading of utility meters has been developed. FIG. 1 shows a schematic of a fixed network automatic utility meter reading system in accordance with one example of the present invention. In this example, the network is used for a water utility system. However, other embodiments of the invention described throughout this document can be used for other types of utility systems such as gas or electric. In these embodiments, data for each type of utility may be transmitted on different frequencies. In FIG. 1, a system of mechanical water meters 8 are shown attached to a corresponding meter interface unit (MIU) 10. The MIU 10 is an electronic unit that collects, analyzes and stores data from the meter 8. In alternative embodiments, the MIU may be integrated into the meter rather than a separate component. The MIU 10 includes a radio transmitter/receiver that transmits the data to a collector 14. In this example, the collector 14 is mounted on a telephone pole. A collector 14 receives, analyzes, and stores the data from multiple MIUs 10. In some embodiments, the collectors 14 are arranged so that each MIU 10 is intended to be in communication with at least two collectors 14 in order to provide redundancy in the system communication links. In the case where multiple collectors are in communication with an MIU, the MIU will identify the collector to which it will transmit its data by use of signal quality or signal link integrity. Occasionally, a single isolated MIU 10 may be located in an area so that it can communicate with only one collector. Once the collector receives the data, it is transmitted to a central host 20 computer that is maintained by the utility. In this example, the collector 14 communicates with the host 20 over telephone lines. However, in other embodiments, other methods of communication could be use such as radio, internet, intranet, wide area network (WAN), etc. It is beneficial to embed multiple links between the Host and collector. If one connection fails then the Collector or Host can switch to an alternate media for communications. This improves system performance and reduces impact of a single failed link. An example is a collector with and integrated high power radio and WiFi options that monitors acknowledgment success from the host and decides to switch between radio and WiFi back haul communication.

The collectors have a receiver in them for receiving the RF signal from the MIU, in some embodiments, the collectors include a transmitter if the system is setup for 2-way communications between the collector and MIU. This receiver (and transmitter in the two way systems) in the collector can be used as an communications link between collectors in addition to or as a back up to the wide area communications link. Often the system is not operating at full capacity. This allows use of this radio as an alternative communication link which in turn saves cost.

In other embodiments, collectors may be located on water towers to gain the height needed to provide a possible three-mile grid. However, it is advantageous to use communications at the longest possible effective range since this reduces the number of collectors needed to service the system. Alternate locations may be on cellular telephone towers, water towers, and other similar utility structures. In some embodiments, the water tower may be used as a reflector for use with a ground based antenna. Public buildings may be suitable in high-density applications. The MIUs may be located on a residential house wall, in an indoor basement, or in a meter pit or vault location or other suitable location. The host will typically be located in the utility main office within the IT department or billing organization.

Some alternative embodiments may use repeaters to retransmit data within the system. Typically, additional collectors will perform the repeater function. In other embodiments, a lower cost repeater may be used to allow reception and retransmission of a few end points that cannot be received directly by the collector. The repeater will use a similar protocol as the collector when communicating to the MIU and will encapsulate the MIU transmission and forward it to the Collector. Repeaters may be located at lower heights such as utility poles and public buildings or private residences.

High-density networks are defined as networks where the number of MIUs per collector is between 10,000 and 50,000. For densities up to 50,000 MIUs per collector, a 3-mile grid would be acceptable. For densities greater than this, collectors typically cannot meet the three-mile grid requirement without special modifications of the system components. Possible modifications of the system include: reducing the height installations with smaller grid size; conducting full duplex operation of the transceivers with separate transmit and receive paths; using multi-channel collectors where each collector uses multiple transmit and receive frequencies; and using directional antennas that are dedicated receivers to a specific segment of the grid. Low-density applications can typically conform to the 3-mile grid performance requirements with no system modifications required. However, it may be possible to use directional gain antennas in these applications to increase the grid size in the preferred direction.

When an MIU is first being installed by a utility technician, the technician activates the MIU with a "magnetic swipe" or other suitable methods of activation. The MIU will respond to the activation by providing a data message with configuration information to the collectors. After activation, the MIU will listen to the collector messages for a period of time. It will use the collector message strength to determine the best link. The MIU will communicate the magnet swipe packet to the collector with the best link margin. In alternative embodiments, the MIU will simply listen for a Collector's acknowledgement signal (ACK or ACK packet) or Time of Day and signal and use this to determine the preferred collector prior to transmitting the configuration packet. In other embodiments, the MIU can be made to use a specific collector by updating the configuration table of the MIU via the Collector or a hand held programming device used during the initialization process.

When the utility technician is in the field at a given MIU location, the service person usually needs to know if the MIU is functional, correctly connected, and in communication with the collector. Typically the utility will activate the MIU and it will read the register and transmit information to the collector. The technician has as portable receiver that receives the MIU transmission that was sent to the collector which indicates the performance of the MIU. The receiver then listens for a response from the collector to know if the collector received the MIU transmission. Additionally, the collector's message can include additional information such as the S/N ratio, etc.

In other embodiments, the collector can send (either directly or through another computer such as the host) an e-mail, or text message when a "magnet packet" is received. This packet is sent for testing purposes. Alternatively, the collector or host computer can send an e-mail or text message when an ID number is received that is not in the system. Alternatively, an e-mail or text message can be sent when an ID number is received that has been listed.

The network may operate in either a "one way" mode or a "two way" communication mode between the MIUs and collectors, or a combination of both. In the one-way mode, the MIUs transmit to the collectors and do not receive communications from the collector in return. One-way MIUs will randomly transmit up to four times per day. This rate allows collection of 99% of the readings each day. One-way MIUs will be received at any collector and the data forwarded to the host. Readings will be current at the time of transmission. The collector will time stamp all received MIU data. The host will gather the data from each collector and create a unique data entry that incorporates the time received, the number of times received and which collectors received the packet.

In a two-way mode, the MIU and collector communicate back and forth with each other exchanging data, status requests, system instructions, etc. Communication from a collector to the MIUs may be simplex, half duplex or full duplex for two way enabled MIUs. Readings will be taken at a fixed time during a 24-hour period. The MIU does not have to transmit the time of read because the system knows the time the MIU is programmed to take the reading (typically at midnight or "zero hour"). Once the consumption data has been transmitted the MIU will listen for a very brief period (approx. 10-30 msec) to receive an acknowledgement and any special communications schedule. MIUs will remain in sleep mode up until the scheduled read or communications time.

The collector will transmit the data received from the MIUs to the host computer. An MIU can store 6-hour reads for one day or daily reads for three days. The collector can store the reading information for 3 days. The host normally receives at least one reading a day, but more can be requested. In addition hourly consumption data can be requested. If the link to the host is ever lost, the collector will continue receiving data from the MIUs and store in the non-volatile memory until the link to the host is re-established. Once reestablished, the data can be transferred. The collector will keep a record of all data for three days. The collector will also keep a record of when it was disconnected and when communication was restored communication to the host.

In a typical system operation, a collector would be installed with continuous two-way communications between itself and the host computer. As MIUs are installed, the MIU will transmit a configuration packet with containing identification and initialization data from the MIU. The MIU ID will incorporate the type of meter data (e.g., water, electric, gas) that is being transmitted. At this point, the MIU would assume it is operating in the "one-way" mode. During installation the MIU initially will listen to the collectors transmitting on the channel in response to the configuration data packet. Each reception from a collector will have the received signal strength (RSSI) logged. The MIU will record the value of up to four transmissions from different collectors that are having adequate transmissions within a timeout period. Once the signal strength values are collected, the MIU will record the top two (if two are found) and use these as its primary and secondary collectors. The primary collector will be the one that the MIU will normally transmit with and establish a signal link of an optimum power. The secondary collector would be the collector that the MIU transmitted to as a back up in case of a link timeout. If no collector is active, the MIU will enter the fall back state where it assumes one-way communications. It will typically try to reestablish communications with the collectors once per day.

In an alternative embodiment, the MIU will listen for an initial "time message" transmission from a collector. If one or more collectors were detected, the MIU would store the identification (ID) of the three collectors with the strongest RSSI. After a specified time interval, the MIU would transmit at full power (typically 1 Watt), identifying itself as operating in a two-way mode and identifying the collector that received with the strongest signal (if there was one). The MIU would look for an acknowledgement signal (ACK) from the collector. The MIU would transmit 3 additional times, each time looking for an ACK. If no ACK was received, the MIU would attempt to establish communications once with each of the additional collectors it initially detected. If no ACK was received from the additional collectors, the MIU would go to the one-way mode of operation. If an ACK was received from a collector, the MIU would set its clock, and switch to the two-way mode of operation with that collector. If at any time the MIU cannot successfully operate in the two-way mode, it will automatically revert to the one-way mode. This is the "fall back" position of a one-way system for the network. Each transmitter would send in the reading 2 to 4 times at random times during a day. The collector would always be listening. If at any time when operating in the one-way mode, the MIU will switch to the two-way mode if it can successfully communicate with a collector. If the host system detects the loss of 2-way operation between collector and MIU, it will attempt to reassign the MIU to a specific collector in addition to the MIU's attempts to reacquire a collector periodically and become two way again.

For example, during the normal mode of operation with random transmissions, the MIU transmits at a random time the data reading and identifies the collector from which it is expecting an ACK. The MIU turns on its receiver for up to one minute. After successfully receiving the reading, the collector will send an ACK to the MIU along with any additional commands desired. If no additional commands were received, the MILD would turn off the receiver until the next time it is suppose to send in a reading. This would normally be the next day. If (no acknowledgement) was received, the MIU would resend the reading. If nothing was received after retransmitting multiple times at random intervals, the MIU would assume it was suppose to revert to the one-way mode. Each time a reading was transmitted, the receiver would be turned on to look for a command or ACK, in which case it would switch to the two-way mode.

The MIU and collector may optimize their communication link to allow lower power transmissions where possible. This avoids collector overload and help to prevent signal collisions among collectors and MIUs. This will also help to extend the battery life. The collector receiver sensitivity and/or transmit power may also be optimized based on the RSSI reading from MIUs. In a typical optimization procedure, the MIU transmits a message at full power that includes flag indicating it is at full power. The collector receives the MIU message, measures the signal to noise ratio, and sends ACK and command for MIU to reduce power for its next signal. The MIU receives ACK, the reduction command and measures RSSI. On the next transmission by MIU, it transmits at reduced power. The MIU's message indicates the amount of its power reduction and may include a command telling the collector the amount to reduce its power by. The collector transmits ACK and includes an indication that the power has been reduced. If the MIU fails to hear the ACK which indicates either the collectors power was reduced too much or the MIUs power was reduced too much), the MIU reverts to full power on the next transmission and the sequence starts over. During typical operations, the MIU may conduct periodic surveys of the strength of system communications links. Typically, the MIU will log the last four collector RSSI values and perform a running average of signal strength. If the margin for the communication link between the MIU and collector is ever below the specified value, the MIU renegotiates the link by transmitting at full power and updating the link values.

In alternative embodiments, the MIU may select the collectors based on the signal to noise (S/N) ratio rather than signal strength alone. This has the advantage of selecting the most efficient communication link between an MIU and a collector. For example, a collector with the strongest signal may not have the best data transmission quality if it has a high volume of noise present. Conversely, a collector with lower signal strength but with a very low noise presence may provide the best data transmission clarity. In an alternate embodiment, the MIU may use the signal to noise ratio measured from the collector's transmission to adjust the power the MIU uses for its transmission. This is similar to the operation described previously but collector does not adjust its power.

Having the MIU responsible for selecting the best collector communications link reduces the burden on the system and makes assignment of MIUs and collectors automatic during installation. Data transmission is controlled at the MIU level with alarms and readings being sent at the time selected by the MIU. This improves scheduling of data transmissions between the MIU and the collector. Additionally, having the MIU control the link selection, transmit power, transmit scheduling and alarms has many other benefits. This distributed control enhances the network performance by reducing the burden on the remainder of the fixed network system operation and management. Battery life for MIU is improved by reduced collisions and retransmissions. It also increases the probability of successful communications by having the MIU manage the link selection and retransmissions during communications problems. Installation is more automatic since no prior configuration of the host or collector system is required to assign the MIUs to a collector.

In some embodiments, the host computer controls the synchronization of the system clocks of the various components. The collectors will receive time stamp information from the host computer. It should be updated on a daily basis. Under normal operation, the collector will transmit to the MIU the correct time at least once every 24 hours. The MIUs will receive time stamp information during acknowledgement message from the collector. In addition, the collector will transmit global time messages periodically such as once per minute if no acknowledgements are sent from the MIUs.

Figure 2:
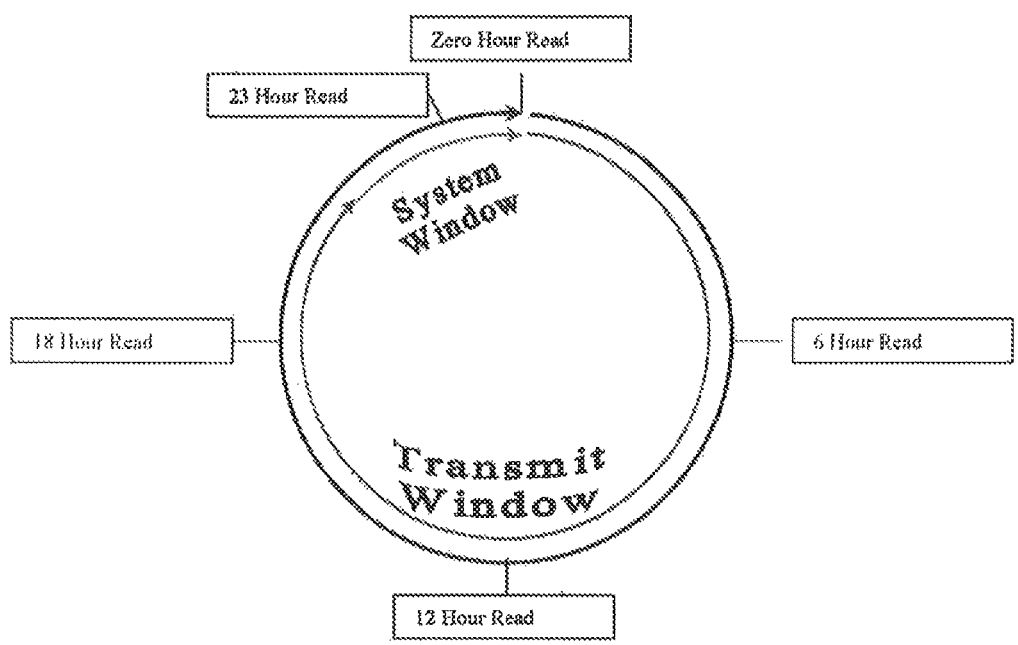
FIG. 2 shows a diagram of a 24-hour transmission schedule for the system in accordance with one example of the present invention.

Two way MIUs will transmit their daily data and alarms on a random and possibly slotted basis except during the Administrative slot periods. Administrative slots are defined as periods where the network performs diagnostics, configuration and program downloads. FIG. 2 shows a diagram of a 24-hour transmission schedule for network. The four-hour segment labeled "System Window" is the administrative slot period. No unrequested data transmission from the MIUs takes place during this window as it is reserved for communications regarding system maintenance. Instead all normal data transmissions from the MIUs will in the twenty-hour segment labeled "Transmit Window". The System Window can also include the time to transmit the RF call sign (CWID). The modem in the collector can be programmed to transmit the call sign using standard call sign methods. The modem can use specific bit patterns that result in meeting the call sign requirements.

In this example, there are two activities that are timed in the MIU on a 24 hour basis. One is the reading cycle and one is for the transmit cycle. The read cycle can provide five reads per day on a 6-hour basis (four 6-hour reads and a Daylight savings time read) or a flow profile transmission of the hourly usage percentage for the entire day. The MIU collects the reads and stores the reads prior to the Zero Hour read. At the time of the Zero Hour read, the consumption of the previous read windows is calculated and stored in a buffer to be transmitted. The read cycle then resumes. After the Zero Hour reads are stored, the MIU calculates the time of the next transmission using four time windows with a random transmission within each window. The formula for the transmission delay value is: T1=INT (RND*Tmax1). Tmax1 is the maximum duration in tenths of seconds of the first transmit period. IND is a random number between 0 and 1. INT is the integer function. There are three other possible retransmissions that use similar formulas. The first retransmission delay is: TR1=Tmax1+INT (RND*Rmax1). The second retransmission delay is: TR2=Tmax1+Rmax1+INT (RND*Rmax2). The third retransmission delay is: TR3=Tmax1+Rmax1+Rmax2+INT (RND*Rmax3).

In one example of a typical two-way operation mode, the MIU collects four readings a day. Then after the six hour reading (or the twelve hour reading on a small system), the MIU starts transmitting its data at the start of transmit interval and transmits all readings at once. In some embodiments, the specific data transmission time is based on the Aloha model using a transmission time interval of 4 hours. When dealing with a fixed network system with multiple collectors and a large number of MIUs, the challenge is to structure the transmission times so as to minimize interference between transmitters. The transmitters use the Aloha method to determine when to transmit. This is a common and well-known practice in radio frequency meter reading systems.

In the normal use of Aloha, a random number is generated based on some pre-determined time period. This random number then determines when the unit will transmit within that time period. As soon as the unit transmits, another random number is generated, and a new transmission time is determined within that time period. The present invention differs and improves on this concept in several ways. First, an initial time period is established each day. The random number determines when the transmission occurs during this time period. As soon as the unit transmits its data, another random number is generated. However, the random number is used to determine when to transmit during the second subsequent time period. In other words, a unit will only transmit once during any time period. This "modified Aloha" procedure is continued until a successful transmission of the data has occurred.

The values of these transmit and retransmit periods have optimum values which allow the highest percentage of reads to be acquired during the transmit period. These values can be found in an interactive process that varies each period in value and finds the resulting optimum value. Thus the initial transmit period and each retransmit period value is optimized to allow the highest number of readings to be transmitted by MIUs to the collector during the transmit time.

If multiple retransmissions of data from the MIUs are frequently required, the MIUs may need to reconfigure the communications links with the collector. In some embodiments, a rolling seven-day window is used to keep track of the number of retransmissions required between a collector and an MIU. If the 13 retransmissions are required in any seven-day period, the MIU will automatically reconfigure its links and select a new primary collector using the procedures previously described.

An ACK packet is sent after receipt of a successful transmission. This stops an MIU from transmitting again after its transmission is successfully received. This reduces the number of units that will attempt to transmit during each successive time period. Because of the reduced number of units transmitting, the length of the subsequent time periods can be reduced and optimized. In the case where up to four transmissions are allowed, the first time period is typically half of the total time of cumulative length of all of the time periods.

In other embodiments, if the MIU goes for three consecutive days without receiving an ACK from the collector with the 1st transmission of that day, it will skip trying during the first time period. If the success rate for the previous ten days falls below 75%, the MIU will skip the first time period. If the success rate is still below 75%, the MIU will skip the first two time periods. If the MIU goes for more than 10 days without an ACK, the MIU will revert to a one-way communication mode. As long as the MIU can receive the time from the collector to keep its internal system clock set, the MIU will continue to take the normal four readings a day in the one-way mode.

In some embodiments, the system shall operate in a frequency range of 450-470 MHz. If operating in a duplex mode, the TX and RX channels are on different frequencies that are typically least 5 MHz apart. The system may also change frequencies in simplex mode as well. In these embodiments, the MIU can be programmed for multiple frequencies for communication. The collector can request the MIU to change frequency it uses. Once changed, the MIU will attempt to make contact with the collector. If contact cannot be made within one hour, the MIU will revert to the last frequency where contact occurred with the collector. In alternative embodiments, the MIU will remain on the new frequency and if communications with the collector are not established, the MIU will operate as a one-way MIU on the new frequency. In other embodiments, the MIU can be programmed to determine if a new frequency should be tried if certain conditions happen. For example, the MIU will change frequency and attempt to establish communications on the new frequency if communications is lost for a certain period of time on the original frequency.

In the 450 MHz frequency band, governmental regulations have different limitations on power and antenna height for different frequencies. Some embodiments of the present invention take advantage of these rules for use in a two-way system. In this embodiment, the MIU would be a transceiver, where the transmitter is on a low power channel and the receiver is on a high power channel. The collector would receive transmissions at low power on the low power channel, while the transmitter of the collector would operate at high power on the high power channel.

Figure 3:
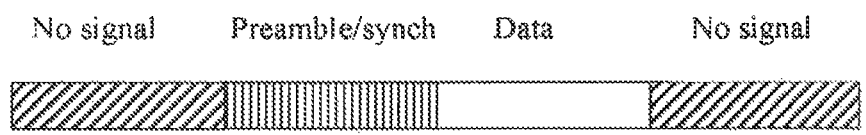
FIG. 3 shows a sequence diagram of a data transmission packet in accordance with one example of the present invention.

FIG. 3 shows a sequence diagram of a data transmission packet for one example of the present invention. Further, FIGS. 4a-4d show detailed sequence diagrams of various examples of transmission packets that will be explained below. The system can include verification data in the messages transmitted within the network. This allows the system to verify that the data received is good and that no transmission errors have taken place. The present invention combines the use of a check sum value (i.e., cyclic redundancy check or CRC) that is calculated from the contents of the data and the system or Utility ID. The collector has the system or Utility ID stored and can recreate the CRC value with the data received to verify that the transmission is good. The system or utility ID is not transmitted as part of the message even though it is used in the CRC calculation. This allows systems that are in proximity to each other to operate without the messages being received with correct CRC by the other utility. It also eliminates the need to transmit the utility ID which reduces the message length. Reduced message length is important since it reduces power consumption of battery powered MIUs and also reduces the probability of messages colliding due to the reduction in transmission duration. Because the Utility ID is not transmitted, it becomes more difficult for an unintended recipient to decode the data with correct CRC.

The present invention sends the usage profile data value as a percentage of daily consumption that occurred each hour. By using the percentage of usage, the data packet does not have the issues of resolution. For example, if a water utility customer used between 0 and 2 gal per hour during a 24-hour period, the measured value of the consumption per hour would need to be to the nearest 0.1 gal to be meaningful. This would require 2 digits of resolution. If the next day, the same customer used between 0 and 5,000 gal per hour, it would take 6 digits to report the consumption to the nearest 0.1 gal. This level of resolution would most likely not be needed. By sending the percentage used each hour, two digits are all that would be required for both of these cases.

If the system uses one byte (8 bits) of data, there are 256 unique values to represent the percentage used each hour. This would normally give us percentage usage value to the nearest ½%. The value of 0% is a unique case. Both where the total consumption for the day is zero and where the usage during a time period is 0% (to the nearest ½%). Taking the case where the value of the usage to the nearest ½% is zero, this could be the result of the usage truly being zero or the usage was less than 0.25%. While the amount of usage may not be significant, the mere fact that there was usage may be significance such as in leak detection analysis. For this special case we will designate a unique value to represent a usage of zero and not just 0%. In another example where the reading for the total consumption is 0 for the 24 hour time period occurs when each hour has used an equal amount. For this special case, the system will assign a unique value to represent a uniform usage for the entire 24 hours. This will reduce the necessary message length.

Once the information is received at the host computer, the total consumption registered on the meter is compared to the previous days total consumption registered on the meter. The percentage value of consumption can be converted to actual usage. As an alternative, the previous day's total consumption registered on the meter, or the total consumption for that 24-hour period could be included with the transmission. Because a value of 0% is less than ¼% (otherwise it would have been recorded as ½%) and more than 0 consumption, it will assign it a value of ⅛%. When the percentage used in each hour is totaled, it may be more or less than 100% due to rounding error. Because this bothers some users, the values will be adjusted at the host so the total will come to 100%.

As an alternative to percentage values, a set number of digits could be sent showing either consumption per hour or the meter reading. The multiplier for the digits would be adjusted according to the consumption used that day. For example, if 2 digits were being sent for each hour and the total consumption was 68,034 gal, the resolution would be to the nearest gallon. If the total consumption were 00.864 gal, the resolution would be to the nearest one hundredth gallon.

The profile packet is a packet that can be programmed in the MIU to be transmitted once per day. The operating scenario for use of the profile packet would be to read at the zero hour (midnight) every day. This reading would be sent on a daily basis in the normal read packet. If flow profiling were enabled, the MIU would take the zero hour read and hourly reads during the day. Hourly consumption information would be stored. After twenty-three hourly reads the next zero hour read would occur. At this point the MIU has two zero hour reads and 23 hourly reads. The total consumption would be determined by the difference of the zero hour reads (Z2−Z1) unless reverse flow occurred during periods of the profile. In this case, the consumption will be the absolute value of the flow in each period so that if negative flow occurs it is treated as forward flow.

The percentage of the total consumption used during each hour would be calculated as $C_n/(Z2-Z1)$, where $C_n$ is the consumption data for the calculated hour. For periods with positive flow, the result of this calculation is an 8 bit value that represents 0-100% in 0.5% increments, (0-200). If the positive flow is more than 0 but less than 0.25% the 8 bit returned value will be 255. This indicates low flow but not zero. If zero consumption is registered in all periods, then the total consumption is shown as zero and all periods return a zero value. For periods with negative flow, the result of this calculation is an 8 bit value that represents 0-100% in 2% increments shown as (201-250). Reverse flow of less than 2% is shown as zero flow. In all cases there will be 24 of these 8 bit values that will be generated and transmitted as a profile packet.

In some embodiments, the system timing may be modified to improve the network performance. The system time is typically controlled by the host computer system. This time is passed to the collectors during communications to the MIU from the collector. The MIU uses the system time to schedule a meter reading schedule and to schedule transmissions and retransmissions to the collectors as well as other features and functions. The time passed from the host computer does not have to correspond to actual time but can be a "System Time". The advantage of having an independent system time is that the MIUs can operate in the same manner with regard to the system time but the system can be optimized to accomplish various goals. In this embodiment, the system time has a point where each daily period begins called the zero hour point. The zero hour point for the system can be set by the host to be any actual time during the day. By setting the zero hour to particular time, numerous system parameters can be optimized. For example, the zero hour can be modified by one hour to accommodate daylight savings time shifts such that the zero hour read occurs at the same hour each day regardless of the state of daylight savings time. Additionally, if it is found that the RF link performance is better at a particular time of day, the zero hour can be shifted to allow the initial transmissions to occur during this optimum time period. This would reduce the need for retransmissions and improve system packet success rate performance and battery life. In another example, the customer may want to capture billing data by a fixed time of day. Having the MIU transmission interval end just prior to the billing capture time would provide the most recent data to the billing system. It should be apparent that other aspects of the system may be optimized by varying the system time in relation to the actual time.

In alternative embodiments, there are times when it is desirable to communicate with the MIU from another device other than the collector such as a hand held or notebook computer. This can occur before the MIU has been programmed with the correct frequency or when the frequency programmed in the MIU needs to be changed. At these times, it is desirable to use the wireless RF link built into the MIU. The problem occurs when the frequency and power level of the RF link are licensed and the MIU does not know the frequency that has been assigned, or the MIU is at a location other than the location that has been licensed. When activated, the MIU listens on a predetermined frequency. The alternative device then communicates with the MIU at reduced the power level to a level that does not require a license.

In other embodiments, a data transmission may use a unique preamble pattern to indicate the beginning of the data transmission and use an inversion of the unique pattern to indicate the end of the data transmission. In this embodiment, the preamble pattern is different for a data encoding pattern.

In other embodiments, the primary collector may transmit a system maintenance message containing the status of the MIU to an installer during the installation process. Additionally, the system firmware and system configuration settings for the MIU may be periodically upgraded via maintenance radio transmissions. Also, temporary configuration commands may be transmitted within an acknowledgement signal to the MIU. These temporary configuration commands will expire after a designated time period and the MIU will revert to a normal operational configuration.

In other embodiments, the system may record and compare communication link quality among the data collectors and use this information for maintenance. For example, the system could monitor system noise versus the time of day and adjust the data transmission time for when the noise is minimal, in other embodiments MIU battery usage is tracked and recorded for maintenance purposes. In this embodiment, battery usage may be recorded as the depth of discharge of the battery.

In other embodiments, the detection of alarm conditions at an MIU is controlled by the host computer. For example, the host may enable, disable or delay the alarm transmission from the MIU. The collect may be instructed to forward the alarm data packet directly to the host immediately upon receipt from the MIU. In an alternative embodiment, the transmission of an alarm data packet may be delayed for some period to avoid data collisions.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A method of communicating data for a utility meter reading system, comprising:
   measuring the actual usage of a metered commodity with a utility meter over a first time period;
   dividing the first time period into a plurality of intervals;
   defining data representative of said measured actual usage as a fractional or percentage value of said measured actual usage over each of said plurality of intervals; and
   transmitting said actual usage and said defined data over a communications network.

2. A method of communicating data for a utility meter reading system, comprising:
   defining data collected from a utility meter by a meter interface unit as fractional or percentage value of usage over a predetermined period of time, wherein said data is defined digitally by a predetermined number of bits providing a data resolution;
   distinguishing between a non-zero value of usage less than the lowest non-zero value within the data resolution and an actual usage of zero; and
   transmitting said defined data from said meter interface unit over a communications network.

3. The method of claim 2, wherein said predetermined time period is one hour.

4. The method of claim 1, wherein said data has a data resolution, and further comprising distinguishing between a non-zero value of usage less than the lowest non-zero value within the data resolution and an actual usage of zero.

5. The method of claim 1, where the percentage or fractional value of usage is an absolute value of usage so that a reverse usage may be shown as a negative value of usage.

6. The method of claim 1, wherein each of said plurality of intervals is equal in duration.

7. The method of claim 6, wherein said first time period is one day, and each interval is one hour long.

8. The method of claim 1, further comprising receiving said transmission over a communications network and converting at least part of said defined data corresponding to at least one interval to an amount of a standard unit of measure.

9. The method of claim 2, where the percentage or fractional value of usage is an absolute value of usage so that a reverse usage may be shown as a negative value of usage.

10. The method of claim 2, further comprising receiving said transmission over a communications network and converting said defined data to an amount of a standard unit of measure.

11. A method of communicating data for a utility meter reading system, comprising:
    collecting data from a utility meter with at least one designated meter interface unit (MIU) where the data comprises utility usage defined as a fractional or percentage value and wherein the data is defined digitally by a predetermined number of bits providing a data resolution;
    distinguishing between a non-zero value of usage less than the lowest non-zero value within the data resolution and an actual usage of zero;
    transmitting the data via a communication link between an MIU and a data collector; and
    transmitting the data from the data collector to a central host computer.

12. The method of claim 11, where the percentage or fractional value of usage is an absolute value of usage so that a reverse usage may be shown as a negative value of usage.

13. The method of claim 11, further comprising receiving said transmission at said data collector and converting said defined data to an amount of a standard unit of measure.

14. The method of claim 11, further comprising receiving said transmission at said host computer and converting said defined data to an amount of a standard unit of measure.

* * * * *